US011325862B2

(12) United States Patent
Weitzel et al.

(10) Patent No.: US 11,325,862 B2
(45) Date of Patent: May 10, 2022

(54) HYDROPHOBIC, WATER-REDISPERSIBLE POLYMER POWDER COMPOSITION

(71) Applicant: WACKER CHEMIE AG, Munich (DE)

(72) Inventors: Hans-Peter Weitzel, Reischach (DE); Ulf Dietrich, Burghausen (DE)

(73) Assignee: WACKER CHEMIE AG, Munich (DE)

(*) Notice: Subject to any disclaimer, the term of this patent is extended or adjusted under 35 U.S.C. 154(b) by 0 days.

(21) Appl. No.: 16/772,413

(22) PCT Filed: Nov. 7, 2018

(86) PCT No.: PCT/EP2018/080511
§ 371 (c)(1),
(2) Date: Jun. 12, 2020

(87) PCT Pub. No.: WO2020/094228
PCT Pub. Date: May 14, 2020

(65) Prior Publication Data
US 2021/0253477 A1    Aug. 19, 2021

(51) Int. Cl.
*C04B 24/26* (2006.01)
*C04B 28/02* (2006.01)
*C04B 40/00* (2006.01)
*C04B 103/00* (2006.01)
*C04B 111/00* (2006.01)
*C04B 111/60* (2006.01)

(52) U.S. Cl.
CPC ...... *C04B 24/2688* (2013.01); *C04B 24/2623* (2013.01); *C04B 28/02* (2013.01); *C04B 40/0042* (2013.01); *C04B 2103/0052* (2013.01); *C04B 2111/00508* (2013.01); *C04B 2111/00517* (2013.01); *C04B 2111/00637* (2013.01); *C04B 2111/00672* (2013.01); *C04B 2111/60* (2013.01); *C04B 2201/30* (2013.01)

(58) Field of Classification Search
CPC . C04B 24/2688; C04B 24/2623; C04B 28/02; C04B 40/0042; C04B 2103/0052; C04B 2111/00508; C04B 2111/0517; C04B 2111/00637; C04B 2111/00672; C04B 2111/60; C04B 2201/30
See application file for complete search history.

(56) References Cited

U.S. PATENT DOCUMENTS

| | | |
|---|---|---|
| 6,191,235 B1 | 2/2001 | Eck et al. |
| 2003/0164478 A1 | 9/2003 | Fiedler et al. |
| 2004/0019141 A1 | 1/2004 | Bastelberger et al. |
| 2006/0254468 A1 | 11/2006 | Bastelberger et al. |
| 2007/0112128 A1* | 5/2007 | Weitzel ............ C08L 31/04 524/557 |
| 2007/0173574 A1 | 7/2007 | Weitzel et al. |
| 2008/0081853 A1 | 4/2008 | Bacher et al. |
| 2014/0171553 A1* | 6/2014 | Wunderlich ...... C04B 40/0039 524/5 |
| 2014/0272402 A1 | 9/2014 | Dubey et al. |
| 2015/0057405 A1 | 2/2015 | Zecha et al. |

FOREIGN PATENT DOCUMENTS

| | | | |
|---|---|---|---|
| CN | 103068767 A | 4/2013 | |
| EP | 1394198 A1 | 3/2004 | |
| EP | 1498446 A1 * | 1/2005 | ............ C08K 3/34 |
| EP | 1763553 B1 | 12/2007 | |
| WO | 9520627 A1 | 8/1995 | |
| WO | 0231036 A1 | 4/2002 | |
| WO | 2004103928 A1 | 12/2004 | |
| WO | 2006061139 A1 | 6/2006 | |

OTHER PUBLICATIONS

English machine translation of EP 1498446. (Year: 2005).*
T.G. Fox, Bull. Am. Physics Soc., 1956, vol. 1, Issue 3, p. 123.
Polymer Handbook 2nd Edition, 1975, J. Wiley & Sons, New York.
J. Schulze, TIZ-Fachberichte, 1985, vol. 109, Issue 9, pp. 698-703.

* cited by examiner

*Primary Examiner* — John E Uselding
(74) *Attorney, Agent, or Firm* — Brooks Kushman P.C.

(57) ABSTRACT

A hydrophobic, water-redispersible polymer powder composition contains
a) a main polymer having
a1) more than 60 parts by weight of vinyl laurate monomer units
a2) 5 to 30 parts by weight of vinyl acetate monomer units,
a3) 5 to 30 parts by weight of ethylene monomer units,
a4) 0 to 10 parts by weight of other ancillary monomer units,
where the parts by weight total 100 parts by weight,
b) 0.5 to 30% by weight of one or more protective colloids,
c) 0 to 30% by weight of antiblocking agent,
d) 0 to 20% by weight of organosilicon compound, and
e) 0 to 20% by weight of fatty acid or derivatives of the fatty acids,
where the %s by weight are based on the total weight of the polymer a).

11 Claims, No Drawings

HYDROPHOBIC, WATER-REDISPERSIBLE POLYMER POWDER COMPOSITION

CROSS REFERENCE TO RELATED APPLICATIONS

This application is the U.S. National Phase of PCT Appln. No. PCT/EP2018/080511 filed Nov. 7, 2018, the disclosure of which is incorporated in its entirety by reference herein.

BACKGROUND OF THE INVENTION

1. Field of the Invention

The invention relates to a hydrophobic, water-redispersible polymer powder composition, to use thereof as hydrophobizing additive, and to dry mortar formulations hydrophobically modified therewith.

2. Description of the Related Art

The expression "water-redispersible polymer powder compositions" (dispersion powders) is used to mean powder compositions which are accessible through drying of the corresponding aqueous dispersions of the main polymers in the presence of protective colloids (drying aids). By virtue of this production procedure, the fine-particle resin of the dispersion is coated by a sufficient amount of water-soluble protective colloid. During drying, the protective colloid acts as an outer coat which prevents caking of the particles. During redispersion in water, the protective colloid again dissolves in water, to give an aqueous dispersion of the original polymer particles (Schulze J. in TIZ, No. 9, 1985).

Dispersion powders of this type, based on homo- or copolymers of ethylenically unsaturated monomers, are used in the construction sector as binders, optionally in combination with hydraulically setting binders such as cement. By way of example, these serve in construction adhesives, renders, mortars and paints for improvement of mechanical strength and of adhesion. In the case of construction materials bound with mineral binders, for example renders, troweling compositions and construction adhesives, there is moreover the need to protect these from weathering effects. When the construction materials, for example external renders, are exposed to rain or snow, capillary effects spread moisture throughout the material, and this can lead to irreversible damage to the entire build. A practical method that has long been widely used to prevent this is hydrophobization of the construction materials.

WO 95/20627 A1 recommends dispersion powders comprising a proportion of water-dispersible silicon compounds, for example silanes, as hydrophobizing binders for construction-chemistry products. WO 02/31036 A1 describes dispersion powder compositions which comprise fatty acid esters as hydrophobizing components. EP 1 394 198 A1 discloses hydrophobically modified, water-redispersible polymer powders which comprise, as a hydrophobic component, a combination of an organosilicon compound with a fatty acid compound. The hydrophobic components are admixed with the appropriate polymer dispersion before the drying thereof. WO 2006/061139 A1 describes hydrophobizing, water-redispersible polymer powders based on a polymer of 50 to 90% by weight of vinyl acetate, 5 to 50% by weight of alpha-branched vinyl ester and 1 to 30% by weight of (meth)acrylate; these can optionally also comprise organosilicon compounds or fatty acids and/or derivatives of these. WO 2004/103928 A1 describes a hydrophobizing, water-redispersible additive which is obtained through spray-drying of an aqueous composition of fatty acids or their derivatives in the presence of polyvinyl alcohol as a drying aid.

The alternatives known hitherto for the hydrophobization of mortar compositions used fatty acids or fatty acid derivatives and/or silanes as constituents of a water-redispersible polymer powder composition. The efficiency of the hydrophobizing component is therefore restricted by the maximal possible loading of the dispersion powder with the additive. The last-mentioned hydrophobizing agents, obtained with polyvinyl alcohol as a drying aid, lack any binder character in the mortar composition.

The invention was therefore based on the object of providing a hydrophobizing additive which acts as a binder in mortar compositions and improves the mechanical strength of the hardened mortar compositions.

SUMMARY OF THE INVENTION

The foregoing objects are achieved by the use of a protective colloid-stabilized main polymer having more than 60 weight percent of vinyl laurate units, and also vinyl acetate and ethylene units, optionally containing one or more organosilicon compounds and/or fatty acid(s) or derivatives thereof.

DETAILED DESCRIPTION OF THE PREFERRED EMBODIMENTS

The invention provides a hydrophobic, water-redispersible polymer powder composition comprising
a) a main polymer having
a1) more than 60 parts by weight of vinyl laurate monomer units
a2) 5 to 30 parts by weight of vinyl acetate monomer units,
a3) 5 to 30 parts by weight of ethylene monomer units,
a4) 0 to 10 parts by weight of other ancillary monomer units,
where the data in parts by weight always give a total of 100 parts by weight,
b) 0.5 to 30% by weight of one or more protective colloids,
c) 0 to 30% by weight of antiblocking agent,
d) 0 to 20% by weight of organosilicon compound,
e) 0 to 20% by weight of fatty acid or derivatives of the fatty acids,
where the data in % by weight are based on the total weight of the polymer a).

It is preferable to copolymerize a1) 65 to 90 parts by weight, more preferably 70 to 90 parts by weight, of vinyl laurate, based in each case on 100 parts by weight of polymer.

It is preferable to copolymerize a2) 10 to 30 parts by weight, more preferably 10 to 20 parts by weight, of vinyl acetate, based in each case on 100 parts by weight of polymer.

It is preferable to copolymerize a3) 5 to 20 parts by weight, more preferably 5 to 15 parts by weight, of ethylene, based in each case on 100 parts by weight of polymer.

It is optionally also possible to copolymerize a4) up to 10 parts by weight, preferably 0.05 to 10 parts by weight, based in each case on 100 parts by weight of polymer, of ancillary monomers. Examples of ancillary monomers are ethylenically unsaturated mono- and dicarboxylic acids, preferably acrylic acid, methacrylic acid, fumaric acid and maleic acid; ethylenically unsaturated carboxamides and ethylenically unsaturated carbonitriles, preferably acrylamide and acrylonitrile; mono- and diesters of fumaric acid and maleic acid, for example the diethyl and diisopropyl esters, and also maleic anhydride, and ethylenically unsaturated sulfonic acids and salts thereof, preferably vinylsulfonic acid and 2-acrylamido-2-methylpropanesulfonic acid. Other suitable ancillary monomers are epoxy-functional comonomers such as glycidyl methacrylate and glycidyl acrylate. Other examples are silicon-functional comonomers such as acryloxypropyltri(alkoxy)- and methacryloxypropyltri(alkoxy) silanes for example methacryloxypropyltrimethoxysilane, vinyltrialkoxysilanes and vinylmethyldialkoxysilanes for example vinyltrimethoxysilane or vinyltriethoxysilane or vinylmethyldimethoxysilane, where by way of example methoxy, ethoxy and ethoxypropylene glycol ether moieties can be present as alkoxy groups.

Greatest preference is given to polymers a) having a1) 65 to 90 parts by weight of vinyl laurate monomer units, a2) 5 to 30 parts by weight of vinyl acetate monomer units, and a3) 5 to 20 parts by weight of ethylene monomer units; these optionally also comprise a4) up to 10 parts by weight of ancillary monomer units, where the data in parts by weight always give a total of 100 parts by weight.

Selection of the monomers and selection of the proportions by weight of the comonomers here is such that the resultant glass transition temperature Tg is generally −60° C. to −20° C., preferably −50° C. to −40° C. The glass transition temperature Tg of the polymers can be determined in a known manner by means of DSC (dynamic scanning calorimetry, DIN EN ISO 11357-1/2), for example with the DSC1 dynamic scanning calorimeter from Mettler-Toledo, in an open crucible with heating rate 10 K/min. The temperature taken as glass transition temperature value in the heat-flux graph is that at the central point of the transition (central point=half transition height of the heat flux transition) in the second heating curve. The Fox equation can also be used for approximate prediction of the Tg. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ represents the mass fraction (% by weight/100) of the monomer n, and $Tg_n$ is the glass transition temperature in kelvins of the homopolymer of the monomer n. Tg values for homopolymers are listed in the Polymer Handbook, 2nd edition, J. Wiley & Sons, New York (1975).

Suitable protective colloids b) are partially hydrolyzed and fully hydrolyzed polyvinyl alcohols; polyvinylpyrrolidones; polyvinyl acetals; polysaccharides in water-soluble form, for example starches (amylose and amylopectin), celluloses and their carboxymethyl, methyl, hydroxyethyl and hydroxypropyl derivates; proteins such as casein or caseinate, soy protein, gelatins; lignosulfonates; synthetic polymers such as poly(meth)acrylic acid, copolymers of (meth)acrylates having carboxy-functional comonomer units, poly(meth)acrylamide, polyvinylsulfonic acids and their water-soluble copolymers; melamine-formaldehydesulfonates, naphthalene-formaldehydesulfonates, styrene-maleic acid copolymers and vinyl ether-maleic acid copolymers.

Preference is given to partially hydrolyzed or fully hydrolyzed polyvinyl alcohols whose degree of hydrolysis is 80 to 100 mol %, in particular partially hydrolyzed polyvinyl alcohols whose degree of hydrolysis is 80 to 95 mol %, and whose Höppler viscosity in 4% aqueous solution is 1 to 30 mPas, preferably 3 to 15 mPas (Höppler measured at 20° C., DIN 53015). The degree of hydrolysis is determined in accordance with DIN 53401 by using NaOH to hydrolyze the residual acetate groups and using HCl for back-titration of the excess NaOH.

Preference is also given to partially hydrolyzed or fully hydrolyzed, hydrophobically modified polyvinyl alcohols whose degree of hydrolysis is 80 to 100 mol % and whose Höppler viscosity in 4% aqueous solution is 1 to 30 mPas, preferably 3 to 15 mPas. Examples here are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates, for example diisopropyl maleate and diisopropyl fumarate, vinyl chloride, vinyl alkyl ethers such as vinyl butyl ether, and alpha-olefins having 2 to 12 carbon atoms, for example ethylene or propylene. The proportion of the hydrophobic units is preferably 0.1 to 10% by weight, based on the total weight of the partially or fully hydrolyzed polyvinyl alcohol. Particular preference is given to partially hydrolyzed or fully hydrolyzed copolymers of vinyl acetate with isopropenyl acetate whose degree of hydrolysis is 95 to 100 mol %. It is also possible to use mixtures of the polyvinyl alcohols mentioned.

Most preference is given to partially hydrolyzed polyvinyl alcohols whose degree of hydrolysis is 85 to 94 mol % and whose Höppler viscosity in 4% aqueous solution is 3 to 15 mPas (Höppler method at 20° C., DIN 53015).

The protective colloids b) mentioned are obtainable through processes known to the person skilled in the art, and are also available commercially.

Suitable antiblocking agents c) are calcium carbonate, magnesium carbonate, talc, gypsum, ground clays, kaolins such as metakaolin, and also finely ground aluminum silicates, kieselguhr, colloidal silica gel, and fumed silicon dioxide, in each case with particle sizes preferably in the range 10 nm to 10 μm.

The hydrophobic, water-redispersible polymer powder composition can optionally also in each case comprise up to 20% by weight of conventional hydrophobizing agents such as d) organosilicon compounds and/or e) fatty acids or derivatives thereof.

Organosilicon compounds d) or fatty acids and derivatives thereof e) suitable as hydrophobizing agents are known to the person skilled in the art and are described in detail in WO 2006/061139 A1.

Examples of organosilicon compounds d) frequently used are alkylalkoxysilanes such as isooctyltriethoxysilane, n-octyltriethoxysilane and hexadecyltriethoxysilane. Examples of frequently used fatty acids and derivatives thereof e) are palmitic acid (n-hexadecanoic acid), stearic acid (n-octadecanoic acid), and also oleic acid (9-dodecenoic acid), and the $C_1$- to $C_{14}$-alkyl esters and alkylaryl esters of lauric acid and of oleic acid, mono- and diglycol esters of lauric acid and of oleic acid, and also the mono-, di- and tri-fatty-acid esters of glycerol with lauric acid and with oleic acid.

Preference is given to hydrophobic, water-redispersible polymer powder compositions which comprise no d) organosilicon compounds and no e) fatty acids or derivatives thereof.

The hydrophobic, water-redispersible polymer powder composition is produced in a manner known per se by means of free-radical-initiated emulsion polymerization in an aqueous medium, followed by drying of the resultant aqueous polymer dispersion. The emulsion polymerization is carried out in the presence of protective colloid b) and/or emulsifier. It is preferable to achieve stabilization exclusively with protective colloid b). The solids content of the resultant aqueous polymer dispersions is generally 25 to 70% by weight, preferably 45 to 65% by weight.

The drying can be achieved by way of example through fluidized-bed drying, thin-layer drying (roll drying), freeze drying or spray drying. Preference is given to spray drying. The spray drying is generally achieved after addition of further protective colloid b) as spraying aid. If the polymer powder is also intended to comprise organosilicon compound d) and/or fatty acid (derivatives) e), these are preferably added to the polymer dispersion before drying thereof. The antiblocking agent c) is preferably added while the powder remains suspended in the drying gas. The spray drying here is achieved in conventional spray drying systems, where single-, two- or multifluid nozzles, or a rotating disk, can be used for atomization. The selected discharge temperature is generally in the range 45° C. to 120° C., preferably 60° C. to 90° C., depending on system, Tg of resin, and desired degree of drying.

The hydrophobic, water-redispersible polymer powder composition can be used in a wide variety of application sectors, for example in dry mortar compositions for the production of construction adhesives, in particular tile adhesive and exterior-insulation-system adhesive, renders, troweling compositions, floor-filling compositions, leveling compositions, sealing slurries, jointing mortars, skimcoats and paints.

The quantity of the hydrophobic, water-redispersible polymer powder composition generally used is 1 to 20% by weight, based on the total weight of the formulation (dry mortar excluding water content) to be hydrophobized.

The hydrophobic, water-redispersible polymer powder composition can also be used in a mixture with another dispersion powder. The quantity used also depends on whether the dispersion powder is used together with mineral binders or as the sole binder.

Because of excellent hydrophobic properties together with strong adhesion to polystyrene, it is particularly advantageous to use the hydrophobizing redispersion powder in construction adhesives and coatings for composite thermal insulation systems (CTIS). Use in skimcoat formulations, i.e. thin topcoat renders, or fine fillers, in each case with thickness generally 1 to 2 mm, is also particularly advantageous. Copolymers with vinyl chloride content, for example VCE copolymer powder from EP 1 763 553 B1, have hitherto been used here. With the present invention, a chlorine-free alternative is available in this application.

Dry mortars generally comprise
i) 0 to 50% by weight of one or more mineral binders,
ii) 1 to 20% by weight of one or more dispersion powders,
iii) 40 to 90% by weight of one or more fillers,
iv) 0.05 to 0.8% by weight of one or more thickeners,
v) optionally up to 5% by weight of other additives,
where the proportions i) to v) are in each case based on the total weight of the dry mortar and give a total of 100% by weight.

Suitable mineral binders i) are cements such as Portland cement, calcium aluminate cement and calcium sulfoaluminate cement; calcium sulfates such as gypsum, hemihydrate and anhydrite; granulated blast-furnace slag, pozzolanic materials, waterglass and lime.

In a preferred embodiment, the hydrophobic water-redispersible polymer powder composition of the invention is used as the sole dispersion powder ii).

Preference is also given to dry mortars which comprise the hydrophobic, water-redispersible polymer powder composition of the invention and also additionally one or more non-hydrophobic dispersion powders differing therefrom.

Examples here are water-redispersible polymer powder compositions based on vinyl acetate homopolymers; on vinyl acetate-ethylene copolymers comprising 1 to 40% by weight of ethylene; on vinyl acetate copolymers comprising 1 to 50% by weight of one or more other comonomers from the group of the vinyl esters having 1 to 12 carbon atoms in the carboxylic acid moiety, for example vinyl propionate, vinyl laurate, vinyl esters of alpha-branched carboxylic acids having 5 to 13 carbon atoms, for example VeoVa9$^R$, VeoVa10$^R$, VeoVa11$^R$; on vinyl acetate copolymers comprising 1 to 40% by weight of ethylene and 1 to 50% by weight of one or more other comonomers from the group of the vinyl esters having 1 to 12 carbon atoms in the carboxylic acid moiety, for example vinyl propionate, vinyl laurate, vinyl esters of alpha-branched carboxylic acids having 5 to 13 carbon atoms, for example VeoVa9$^R$, VeoVa10$^R$, VeoVa11$^R$; on vinyl acetate copolymers comprising 1 to 40% by weight of ethylene and 1 to 50% by weight of (meth)acrylates of unbranched or branched alcohols having 1 to 15 carbon atoms, in particular methyl methacrylate, methyl acrylate, n-butyl acrylate or 2-ethylhexyl acrylate; on vinyl acetate copolymers comprising 1 to 30% by weight of vinyl laurate or vinyl esters of an alpha-branched carboxylic acid having 5 to 13 carbon atoms, and also 1 to 30% by weight of (meth)acrylates of unbranched or branched alcohols having 1 to 15 carbon atoms, in particular methyl methacrylate, methyl acrylate, n-butyl acrylate or 2-ethylhexyl acrylate, where these can also comprise 1 to 40% by weight of ethylene; or on vinyl acetate copolymers comprising 1 to 40% by weight of ethylene and 1 to 60% by weight of vinyl chloride.

Other examples are water-redispersible polymer powder compositions based on methyl methacrylate copolymers comprising n-butyl acrylate and/or 2-ethylhexyl acrylate and optionally ethylene; on styrene copolymers comprising one or more monomers from the group of methyl acrylate, ethyl acrylate, propyl acrylate, n-butyl acrylate, 2-ethylhexyl acrylate; or on styrene-butadiene copolymers.

Suitable fillers iii) are quartz sands, dolomite, talc, mica, and also low-density fillers such as expanded-glass granulates and expanded clays.

Thickeners iv) used generally comprise polysaccharides, for example starch ethers, cellulose ethers and modified cellulose ethers, and mineral phyllosilicates, for example bentonite or talc.

Examples of other additives are setting accelerators, for example sodium sulfate or calcium formate; setting retarders, for example tartaric acid or calcium tartrate or calcium citrate; dispersing agents, for example polyacrylates; antifoams, airpore-formers, natural fibers and polymer fibers.

The dry mortar formulation is generally produced by mixing and homogenizing components i) to v) in conventional powder-mixing devices to give a dry mortar. The required quantity of water is added directly before the material is used. In another possible procedure, addition of individual components is delayed until after water has been incorporated into the mixture.

The examples below serve to provide further details of the invention:

Example 1:

Production of the Hydrophobic, Water-Redispersible Polymer Powder Composition.

The following components formed an initial charge in a pressurizable reactor with a volume of 600 liters:
102.7 kg of water,
98 kg of a 20% aqueous solution of a partially hydrolyzed polyvinyl alcohol whose degree of hydrolysis is 88 mol % and whose Höppler viscosity is 4 mPas (determined in accordance with DIN 53015 at 20° C. in 4% aqueous solution),
250 g of formic acid (85% in water),
465 g of iron ammonium sulfate solution (1% in water).

The reactor was evacuated. 23.3 kg of vinyl acetate and 116.5 kg of vinyl laurate were then added to the initial charge. The reactor was then heated to 55° C. and ethylene was introduced until the pressure in the reactor was 26 bar (the corresponding quantity of ethylene being 16.5 kg).

The polymerization was initiated by beginning addition of a 3% aqueous tert-butyl hydroperoxide solution and of a 5% aqueous Na hydroxymethanesulfinate solution (Brüggolit), in each case at a rate of 1.6 kg/h. As the polymerization began, the reactor temperature was increased uniformly to 75° C. within a period of 30 min. Once 75° C. had been reached, further ethylene was added at a pressure of 30 bar until the desired total quantity of 24 kg had been reached. 30 minutes after polymerization had begun, a monomer mixture consisting of 11.65 kg of vinyl acetate and 81.5 kg of vinyl laurate was added over a period of 2.5 hours. Likewise 30 minutes after the reaction had begun, an aqueous solution consisting of 17.5 kg of the abovementioned 20% polyvinyl alcohol solution and 21.9 kg of water was added at a rate of 15.7 kg/h over a period of 2.5 h. The initiator additions were adjusted as required by the reaction and were continuously increased within the 2.5 h. Once the monomer addition and the aqueous addition had ended, the initiator additions continued for a further 90 minutes at a rate of 3.2 kg/h in order to obtain complete polymerization of the mixture. Total polymerization time was 5 hours.

In order to remove excess ethylene, the dispersion was then transferred into the unpressurized reactor, the pressure applied thereto being 0.7 mbar, where it underwent post-polymerization through addition of 1.9 kg of a 10% aqueous tert-butyl hydroperoxide solution and 3.2 kg of a 5% aqueous Na hydroxymethanesulfinate solution (Brüggolit). The pH was adjusted to 4.0 by addition of sodium hydroxide (10% aqueous solution), and 40 kg of water were added to dilute the mixture. Finally, the mixture was discharged from the unpressurized reactor by way of a 250 µm sieve.

This gave an aqueous dispersion of a vinyl acetate-vinyl laurate-ethylene copolymer with solids content 52% by weight, the copolymer being composed of 14% by weight of vinyl acetate units, 78% by weight of vinyl laurate units and 8% by weight of ethylene units.

500 g of this dispersion were blended with 640 g of an 11% by weight aqueous solution of a partially hydrolyzed polyvinyl alcohol whose degree of hydrolysis was 88 mol % and whose Höppler viscosity was 13 mPas and with 582 g of a 20% by weight aqueous solution of a partially hydrolyzed polyvinyl alcohol whose degree of hydrolysis was 88 mol % and whose Höppler viscosity was 4 mPas (in each case determined in accordance with DIN 53015 at 20° C. in 4% aqueous solution), and homogenized for 2 hours at 25° C.

The resultant mixture was diluted with 3 kg of water to a viscosity of 80 mPas (Brookfield, 20 rpm, spindle 1, 23° C.). The material was then dried by spray drying in a cocurrent dryer with input temperature 135° C. and output temperature 85° C., with addition of 2.5% by weight of kaolin, based on the content of polymeric constituents.

This gave a colorless powder with good flowability. The powder was blended with a further 10% of kaolin, based on the content of polymeric constituents.

Test Formulation:
The following mortar formulation was used for testing of hydrophobic effect:

| Constituents | Parts by weight |
| --- | --- |
| White cement (Dyckerhoff CEM I 52,5 R) | 148.13 |
| Lime (Walhalla Edelhydrat) | 20.41 |
| Cellulose ether (Tylose MH 10007 P4) | 1.60 |
| Calcium carbonate (Omyacarb 40 GU) | 169.41 |
| Calcium carbonate (Omyacarb 130 GU) | 163.29 |
| Quartz sand (Quarzwerke HR 81 T) | 497.16 |
| Total: | 1000.00 |
| Water | 280.00 |

Substances used for comparison with the hydrophobizing additive of the invention were commercially obtainable hydrophobizing agents:
Sodium oleate (Ligaphob N 90, Peter Greven GmbH & Co. KG)
Silane/fatty acid ester mixture (Silres Powder D, Wacker Chemie AG)

Hydrophobizing effect was tested in the test formulation in each case after addition of 0.2% by weight or 0.3% by weight of hydrophobizing agent, based in each case on the total weight of the dry mortar. A dry mortar formulation with no addition of hydrophobizing agent was also tested (=zero blend).

Test Methods:
Determination of Water Absorption in $Kg/m^2$:
Water absorption in $kg/m^2$ provides information concerning surface water absorption due to capillary or absorptive forces and, respectively, degree of hydrophobization.

The water penetration value is determined by a method based on DIN 52617 and ETAG 004.

Water absorption in $kg/m^2$ was determined from the increase in mass of the test sample and the size of the absorption surface after immersion of the sample surface (absorption surface) in water.

The mortar described above was mixed by a method based on DIN 196-1, and then applied in a thickness of 4 mm to a gas concrete panel (thickness 3.5 cm, diameter 21 cm) which had been prewetted (30 seconds under flowing tap water) and a piece of glass fabric with the same dimensions was then placed into the material.

Excess material was once again removed by the trowel. The sample was hardened under standard conditions (23° C./50% relative humidity), and after 6 days was sealed with silicone resin on its sides. The test sample was then placed in tap water for 24 hours, and then dried for 24 hours at 50° C. This procedure was then repeated three times.

The test sample was weighed before the first immersion into the water bath. Water absorption [$kg/m^2$] was calculated by dividing the weight increase, measured after the final wetting/drying cycle, by the area tested.

Table 1 collates the results.
Determination of Capillary Water Absorption $Kg/(m^2*Min^{0.5})$:
Capillary water absorption was determined by the method of DIN EN 1015-18.

The abovementioned mortar mixture was produced by a method based on DIN 196-1 for the determination of capillary water absorption. The mortar mixture was used to produce prisms, in each case measuring 40×40×160 mm, in a shuttering mold.

The material was then kept for 2 days under standard conditions (50% relative humidity, 23° C.) in the shuttering mold, which had been covered with a plastics film.

The material was then removed from the mold, and the test samples were placed in a plastics carrier bag under airtight conditions for a further 5 days (95% humidity, 20° C.). They were then stored for 21 days under standard conditions (50% relative humidity, 23° C.) to reach constant mass.

One day before the end of the conditioning period, which lasted 28 days in total, a sealant (silicone resin) was coated onto the 4 longitudinal sides of the test samples, and after the test samples had been dried (generally on the next day) each of these was broken into two halves.

The initial weight (M0) of each test sample was determined before it was immersed in water.

The test samples were placed in a dish, with the fractured surface of the broken prisms facing downward; there were two strips of material here to hold the test samples away from the base of the dish, and the test samples were immersed in water to a depth of 5 to 10 mm for the duration of the test.

The test samples were removed from the water after an immersion time of 10 min. Water on the surface was wiped away with a towel (kitchen paper). Each of the test samples was then weighed (M1).

Immediately thereafter, the test samples were again placed in the dish, with the fractured surface facing downward, and were removed after an immersion time of 90 min, and were again in each case weighed after any water had been wiped off (M2).

The coefficient of capillary water absorption was determined from the following equation: $C=0.1(M2-M1) \cdot kg/(m^2 * min^{0.5})$.

Table 1 collates the results.

Determination of Flexural Tensile Strength and Compressive Strength:

The abovementioned mortar mixture was produced by a method based on DIN 196-1. The mortar mixture was used to produce prisms, in each case measuring 40×40×160 mm, in a shuttering mold. After one day, the material was removed from the mold, and the prisms were stored under standard conditions (23° C./50% relative humidity) for 28 days.

Flexural tensile strength was then determined in the three-point flexural test in accordance with DIN 51902 (test equipment: Toni Prax) using 500N/s, and compressive strength was determined in accordance with DIN 51910 using 2460 N/sec.

Table 2 collates the results.

TABLE 1

| Hydrophobizing agent | Water penetration value in kg/m² for 0.2% addition | Capillary water absorption in kg/(m²*min^0.5) for 0.3% addition |
|---|---|---|
| Zero blend | 0.52 | 0.74 |
| Powder D | 0.33 | 0.29 |
| Ligaphob N 90 | 0.25 | 0.24 |
| Example 1 | 0.26 | 0.18 |

TABLE 2

| Hydrophobizing agent | FTS for 0.2% | FTS for 0.3% | CS for 0.2% | CS for 0.3% |
|---|---|---|---|---|
| Zero blend | 2.6 | 2.6 | 5.9 | 5.9 |
| Powder D | 2.3 | 2.3 | 5.1 | 4.9 |
| Ligaphob N 90 | 2.0 | 1.8 | 4.3 | 3.9 |
| Example 1 | 2.6 | 2.7 | 6.3 | 6.3 |

Flexural tensile strength (FTS) in N/mm² for 0.2% and 0.3% addition
Compressive strength (CS) in N/mm² for 0.2% and 0.3% addition The test results show that, with respect to hydrophobization, the hydrophobizing agent of the invention is superior to the commercially obtainable preparations (table 1).

In contrast to the commercially obtainable preparations, hydrophobization according to the invention is not accompanied by any decrease of mechanical strength. Instead, when comparison is made with the zero blend, flexural tensile strength and compressive strength are improved.

What is claimed is:

1. A hydrophobic, water-redispersible polymer powder composition, comprising:
    a) a main polymer, comprising
        a1) 65 to 90 parts by weight of vinyl laurate monomer units
        a2) 5 to 30 parts by weight of vinyl acetate monomer units,
        a3) 5 to 30 parts by weight of ethylene monomer units,
        a4) 0 to 10 parts by weight of other ancillary monomer units,
    where the parts by weight of a1) to a4) total 100 parts by weight,
    b) 0.5 to 30% by weight of one or more protective colloids,
    c) 0 to 30% by weight of antiblocking agent(s),
    d) 0 to 20% by weight of organosilicon compound(s),
    e) 0 to 20% by weight of fatty acid(s) or derivatives thereof,
    where the %s by weight are based on the total weight of the polymer a).

2. The hydrophobic, water-redispersible polymer powder composition of claim 1, wherein the main polymer a) comprises 70 to 90 parts by weight of vinyl laurate a1).

3. The hydrophobic, water-redispersible polymer powder composition of claim 1, wherein the main polymer a) comprises:
    a1) 65 to 90 parts by weight of vinyl laurate monomer units,
    a2) 5 to 30 parts by weight of vinyl acetate monomer units, and
    a3) 5 to 20 parts by weight of ethylene monomer units, and it optionally also comprises
    a4) up to 10 parts by weight of ancillary monomer units.

4. The hydrophobic, water-redispersible polymer powder composition of claim 1, wherein protective colloid b) comprises one or more partially hydrolyzed polyvinyl alcohols whose degree of hydrolysis is 85 to 94 mol % and whose Höppler viscosity in 4% aqueous solution is 3 to 15 mPas.

5. A process for the production of a hydrophobic, water-redispersible polymer powder composition of claim 1, comprising free-radical-initiated emulsion polymerizing the monomers in an aqueous medium, followed by drying a resultant aqueous polymer dispersion.

6. A dry mortar composition, comprising a hydrophobic, water-redispersible polymer powder composition of claim 1.

7. A dry mortar composition for production of construction adhesives, renders, troweling compositions, floor-filling compositions, leveling compositions, sealing slurries, jointing mortars, skimcoats, or paints, comprising at least one hydrophobic, water-redispersible polymer powder composition of claim 1.

8. A construction adhesive or coating for composite thermal insulation systems, comprising a hydrophobic, water-redispersible polymer powder composition of claim 1.

9. A skimcoat formulation, comprising at least one hydrophobic, water-redispersible polymer powder composition of claim 1.

10. A dry mortar composition, comprising:
  i) 0 to 50% by weight of one or more mineral binders,
  ii) 1 to 20% by weight of one or more dispersion powders,
  iii) 40 to 90% by weight of one or more fillers,
  iv) 0.05 to 0.8% by weight of one or more thickeners,
  v) optionally up to 5% by weight of other additives,
wherein at least one dispersion powder ii) comprises a hydrophobic, water-redispersible polymer powder composition of claim 1.

11. The dry mortar composition of claim 10, wherein the dispersion powders ii) further comprise one or more non-hydrophobic dispersion powders, selected from the group consisting of vinyl acetate homopolymers; vinyl acetate-ethylene copolymers comprising 1 to 40% by weight of ethylene; vinyl acetate copolymers comprising 1 to 50% by weight of vinyl esters having 1 to 12 carbon atoms in the carboxylic acid moiety; vinyl acetate copolymers comprising 1 to 40% by weight of ethylene and 1 to 50% by weight of one or more vinyl esters other than vinyl acetate having 1 to 12 carbon atoms in the carboxylic acid moiety; vinyl acetate copolymers comprising 1 to 40% by weight of ethylene and 1 to 50% by weight of (meth)acrylates of unbranched or branched alcohols having 1 to 15 carbon atoms; vinyl acetate copolymers comprising 1 to 30% by weight of vinyl laurate or vinyl esters of an alpha-branched carboxylic acid having 5 to 13 carbon atoms and also 1 to 30% by weight of (meth)acrylates of unbranched or branched alcohols having 1 to 15 carbon atoms and optionally 1 to 40% by weight of ethylene; vinyl acetate copolymers comprising 1 to 40% by weight of ethylene and 1 to 60% by weight of vinyl chloride; methyl methacrylate copolymers comprising n-butyl acrylate and/or 2-ethylhexyl acrylate and optionally ethylene; styrene copolymers comprising one or more of the monomers methyl acrylate, ethyl acrylate, propyl acrylate, n-butyl acrylate, and 2-ethylhexyl acrylate; and styrene-butadiene copolymers.

* * * * *